US010142564B2

(12) United States Patent
D'Alessandro

(10) Patent No.: US 10,142,564 B2
(45) Date of Patent: Nov. 27, 2018

(54) CAPTURING AN IMAGE OF A SCENE USING A SEQUENCE OF PORTIONS OF THE SCENE CAPTURED BY A SENSOR

(71) Applicant: Imagination Technologies Limited, Kings Langley (GB)

(72) Inventor: Crescenzo D'Alessandro, Great Missenden (GB)

(73) Assignee: Imagination Technologies Limited, Kings Langley (GB)

( * ) Notice: Subject to any disclaimer, the term of this patent is extended or adjusted under 35 U.S.C. 154(b) by 1 day.

(21) Appl. No.: 15/383,937

(22) Filed: Dec. 19, 2016

(65) Prior Publication Data
US 2017/0180651 A1 Jun. 22, 2017

(30) Foreign Application Priority Data
Dec. 18, 2015 (GB) .................................. 1522384.5

(51) Int. Cl.
*H04N 5/265* (2006.01)
*G03B 11/00* (2006.01)
*H04N 5/232* (2006.01)
*H04N 3/14* (2006.01)
*H04N 5/225* (2006.01)
*H04N 5/349* (2011.01)

(52) U.S. Cl.
CPC ............. *H04N 5/265* (2013.01); *G03B 11/00* (2013.01); *H04N 3/1587* (2013.01); *H04N 5/2254* (2013.01); *H04N 5/23212* (2013.01); *H04N 5/349* (2013.01)

(58) Field of Classification Search
CPC .... G03B 11/00; H04N 5/1587; H04N 5/2254; H04N 5/23212; H04N 5/265; H04N 5/349
See application file for complete search history.

(56) References Cited

U.S. PATENT DOCUMENTS 9,628,693 B2 * 4/2017 Liu ...................... H04N 5/2254
2004/0239798 A1 * 12/2004 Nayar ................... H04N 5/235
348/362

(Continued)

FOREIGN PATENT DOCUMENTS

EP 3001672 A1 3/2016

OTHER PUBLICATIONS

Nagahara et al.,"Programmable Aperture Camera Using LCoS," ECCV'10 Proceedings of the 11th European conference on Computer vision: Part VI, pp. 337-350, Heraklion, Crete, Greece—Sep. 5-11, 2010.

*Primary Examiner* — Amy Hsu
(74) *Attorney, Agent, or Firm* — Vorys, Sater, Seymour and Pease LLP; Vincent M DeLuca

(57) ABSTRACT

An imaging device for capturing an image of a scene, comprising: an image sensor; an optical arrangement operable to focus light from a portion of the scene onto the image sensor while preventing light from other portions of the scene from being focused onto the sensor; a controller configured to cause the optical arrangement to focus light from a sequence of portions of the scene onto the sensor so that the sensor captures the said sequence of portions of the scene; and a processor configured to use the captured portions of the scene to construct an image of the scene.

19 Claims, 6 Drawing Sheets

(56) References Cited

U.S. PATENT DOCUMENTS

| | | | |
|---|---|---|---|
| 2010/0277576 A1* | 11/2010 | Fattal | H04N 5/222 348/54 |
| 2011/0204209 A1* | 8/2011 | Barrows | G02B 27/58 250/208.1 |
| 2012/0032919 A1* | 2/2012 | Travis | G06F 3/0425 345/175 |
| 2016/0182806 A1* | 6/2016 | Liu | H04N 5/2254 348/349 |
| 2017/0195574 A1* | 7/2017 | Wong | H04N 5/23267 |

* cited by examiner

CAPTURING AN IMAGE OF A SCENE USING A SEQUENCE OF PORTIONS OF THE SCENE CAPTURED BY A SENSOR

This disclosure relates to capturing an image of a scene using an imaging device. In particular, aspects of the disclosure relate to sequentially capturing portions of a scene and constructing the image from the captured portions.

BACKGROUND

An image may be considered as a two-dimensional representation of a scene. Traditionally, imaging devices such as cameras captured images on a film. More recently, digital cameras have enjoyed increasing popularity and demand. A digital camera uses a solid-state device to capture the light coming in through the lens in order to capture a scene. The solid state device may be referred to as a sensor. There are different types of sensor, for example complementary metal oxide semiconductor (CMOS) sensors, or charge coupled device (CCD) sensors. The sensor comprises a number of pixels, and each pixel may comprise a photodetector (e.g. a photodiode). The pixels may be arranged in an array. When light is incident on the sensor, each photodiode may release a number of electrons in proportion to the photon flux density incident on that photodiode. The electrons released for each photodiode may subsequently be converted into a voltage (e.g. in the case of CMOS sensors) or a charge (e.g. in the case of CCD sensors) associated with each pixel which can then be processed to form a digital representation of the captured scene.

A schematic illustration of an example imaging device capturing a scene is shown in FIG. 1. In this example the imaging device is denoted generally at 100 and comprises a lens 104 and image sensor 106. Light from a scene to be captured 102 passes through lens 104. The lens focuses the light that passes through it onto a sensor 106. The sensor comprises a plurality of pixels arranged as an array indicated at 108. The amount of light that passes through the lens may be controlled by an aperture of the imaging device (not shown). A single lens is shown here for the purposes of illustration, but it will be appreciated that there may be an arrangement of lenses between the aperture and the sensor 106.

There are a number of factors that govern the performance of the sensor 106. One factor may be the resolution of the sensor, which is dependent on the number of pixels in the sensor array. For example, a greater number of pixels may enable more detail of the scene to be captured. Another factor may be the size of the pixels themselves. As well as a photodiode, each pixel may contain other components such as one or more transistors. The transistors may for example be used to convert the charge of the released electrons to a voltage, to reset the photodiode to allow a new image of the scene to be captured and/or to transfer the voltage to other circuitry for processing. Consequently a portion of the photodiode area may be blocked by the other components of the pixel. The proportion of the photodiode area of each pixel that is unobstructed (and thus capable of absorbing photons) may be referred to as the fill factor of the sensor. A lower fill factor may result in each pixel releasing a reduced number of electrons for a given intensity of light, which may lead to a corresponding decrease in the signal-to-noise ratio for the sensor.

It may be the case that there are limitations on the physical size of the sensor to be employed in an imaging device. These limitations may be set by power requirements, cost etc. Limiting the size of the sensor means that to optimise the performance of the sensor a balancing act may be required between the number of pixels in the array and the individual pixel size. For example, if the number of pixels in the array is increased at the expense of individual pixel size, the signal-to-noise ratio of the captured image may be unacceptably low. Conversely, if the size of the pixels is increased at the expense of the number of pixels in the array, the level of detail of the captured image may be unacceptably low.

SUMMARY

According to a first aspect of the present disclosure there is provided an imaging device for capturing an image of a scene, comprising: an image sensor; an optical arrangement operable to focus light from a portion of the scene onto the image sensor whilst preventing light from other portions of the scene from being focused onto the sensor; a controller configured to cause the optical arrangement to focus light from a sequence of portions of the scene onto the sensor so that the sensor captures the said sequence of portions of the scene; and a processor configured to use the captured portions of the scene to construct an image of the scene.

The optical arrangement may comprise a mask unit and one or more optical elements.

The mask unit may be operable to pass light from a portion of the scene whilst blocking light from other portions of the scene, and the one or more optical elements may be configured to focus light passing through the mask unit on to the image sensor.

The controller may be configured to cause the mask unit to pass light from a sequence of portions of the scene so that the sensor captures the said sequence of portions of the scene.

The one or more optical elements may be disposed between the mask unit and the image sensor.

The mask unit may be integral with the one or more optical elements.

The mask unit may be a liquid-crystal array providing a plurality of windows each operable to pass light from a portion of the scene whilst blocking light from other portions of the scene.

The controller may be configured to cause the array to pass light through a sequence of windows whilst at each stage preventing light from passing through remaining windows of the array.

The image sensor may comprise a plurality of pixels and the one or more optical elements may be configured to focus light passing through each window of the liquid-crystal array on to the pixels of the image sensor.

The windows of the liquid-crystal array may be arranged in a series of rows, and the one or more optical elements may be configured to focus light passing through the window of each row on to the pixels of the image sensor.

The windows of the liquid-crystal array may be arranged in a series of columns, and the one or more optical elements may be configured to focus light passing through the window of each row on to the pixels of the image sensor.

The constructed image may contain pixel data for a number of pixels greater than the number of pixels in the image sensor.

The liquid-crystal array may be an LCD device. It may be an LCoS device.

The processor may be configured to stitch the captured portions of the scene together to construct the image of the scene.

The one or more optical elements may be a single lens.

The optical arrangement may comprise a plurality of optical elements each corresponding to one or more windows of the liquid-crystal array, each optical element being configured to focus light passing through its corresponding one or more windows on to the sensor.

Each of the optical elements may be a prism. Each of the optical elements may be a lens.

According to a second aspect of the present disclosure there is provided a method of capturing an image of a scene with an imaging device having an image sensor and an optical arrangement operable to focus light from a portion of the scene onto the image sensor whilst preventing light from other portions of the scene from being focused onto the sensor, the method comprising: electronically controlling the optical arrangement to focus light from a sequence of portions of the scene onto the sensor so the sensor captures the said sequence of portions of the scene; and using the captured portions of the scene to construct an image of the scene.

At each stage of the sequence, light from a portion of the scene may be passed whilst light from remaining portions of the scene is blocked.

The method may comprise masking a sequence of portions of the scene and, at each stage of the sequence, passing and focusing light from an unmasked portion onto the sensor.

The method may comprise constructing the image of the scene from each of the captured portions. The image of the scene may be constructed by stitching the captured portions using an image-stitching algorithm executed at a processor.

BRIEF DESCRIPTION OF THE DRAWINGS

The present disclosure will now be described by way of example with reference to the accompanying drawings. In the drawings.

DETAILED DESCRIPTION

Figure 1:
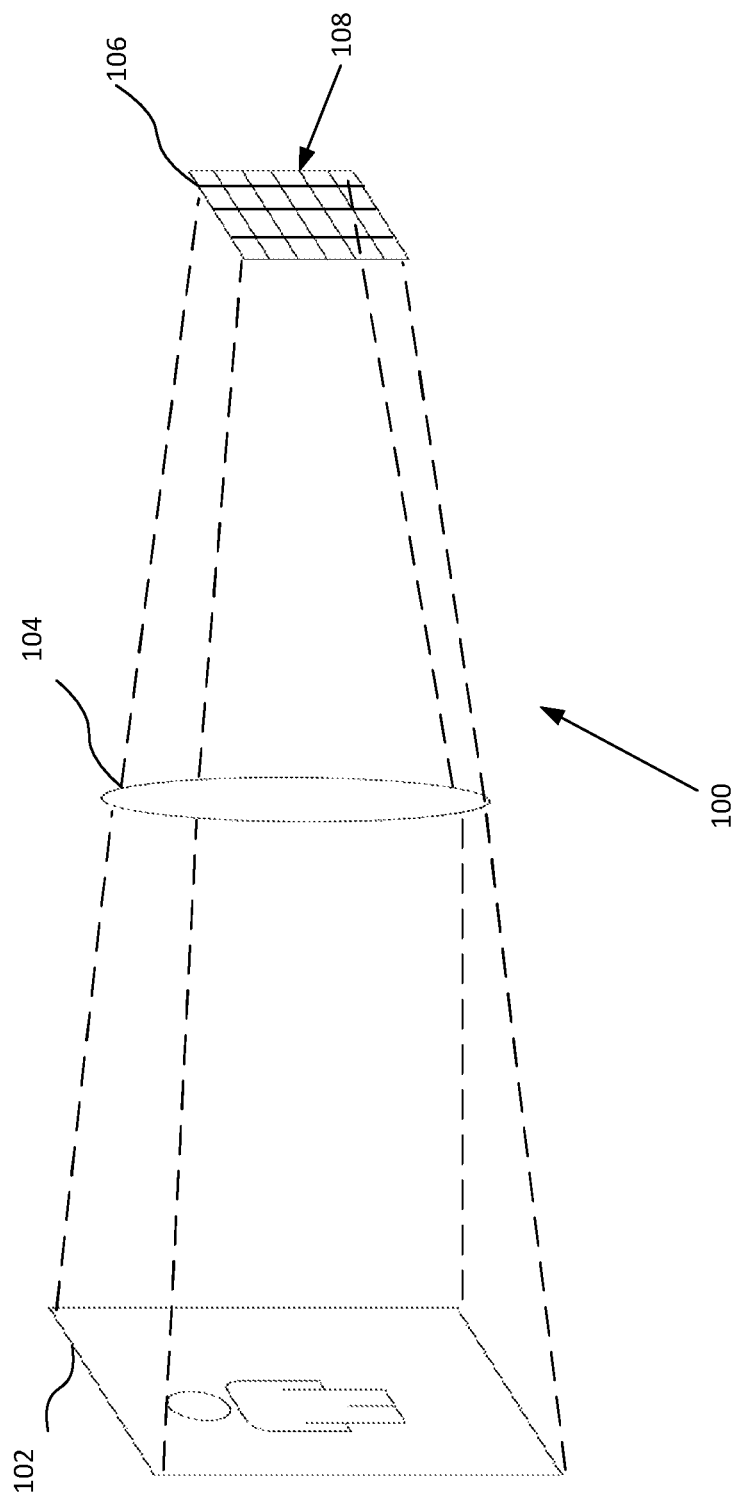
FIG. 1 shows a schematic illustration of an exemplary conventional imaging device.

The following description is presented by way of example to enable a person skilled in the art to make and use the invention. The present invention is not limited to the embodiments described herein and various modifications to the disclosed embodiments will be apparent to those skilled in the art.

There are described herein various examples of an imaging device for capturing an image of a scene. The imaging device comprises an optical arrangement and an image sensor. The optical arrangement is operable to focus light from a portion of a scene onto the sensor whilst preventing light from other portions of the scene from being focused onto the sensor. A controller causes the optical arrangement to focus light from a sequence of portions of a scene to be captured on to the sensor so that the sensor in turn captures that sequence of portions of the scene. The controller may control the optical arrangement electronically. A processor then uses the captured portions of the scene to construct the image of the scene. In other words, the optical arrangement sequentially masks out portions of a scene that is to be imaged. Thus the sensor can be used to capture only portions of the scene at each stage of the sequence that are not masked out. This may improve the quality of a captured image for a given sensor size compared to conventional imaging devices. It may also enable the size of the sensor to be reduced for a given desired image resolution compared to conventional imaging devices.

The optical arrangement may comprise a mask unit configured to pass light from a portion of the scene whilst preventing light from other portions of the scene from passing, and one or more optical elements configured to focus light that passes through the mask unit onto the sensor. The optical elements may be one or more lenses, one or more prisms or a combination thereof. The mask unit may be a liquid-crystal array (LCA). The LCA may provide a plurality of windows that are each configured to selectively permit light from portions of the scene to pass therethrough under the control of a controller. The controller may electronically control the LCA to mask out a sequence of portions of the scene whilst at each stage of the sequence permitting light from an unmasked portion of the scene from passing through. The LCA could for example be a liquid-crystal on silicon (LCoS) device, and the controller may control the amount of light that passes through each window by selectively applying a voltage to each window to align the liquid crystals in a certain orientation. The optical elements are configured to focus, or direct, light that passes through each window of the LCA onto the sensor. The controller is used to control the LCA so that light is permitted to pass through a sequence of windows of the array whilst at each stage of the sequence preventing light from passing through the remaining windows. In this manner the sensor sequentially captures portions of the scene. In other words the LCA can be used to sequentially mask out areas of the scene being captured.

Figure 2:
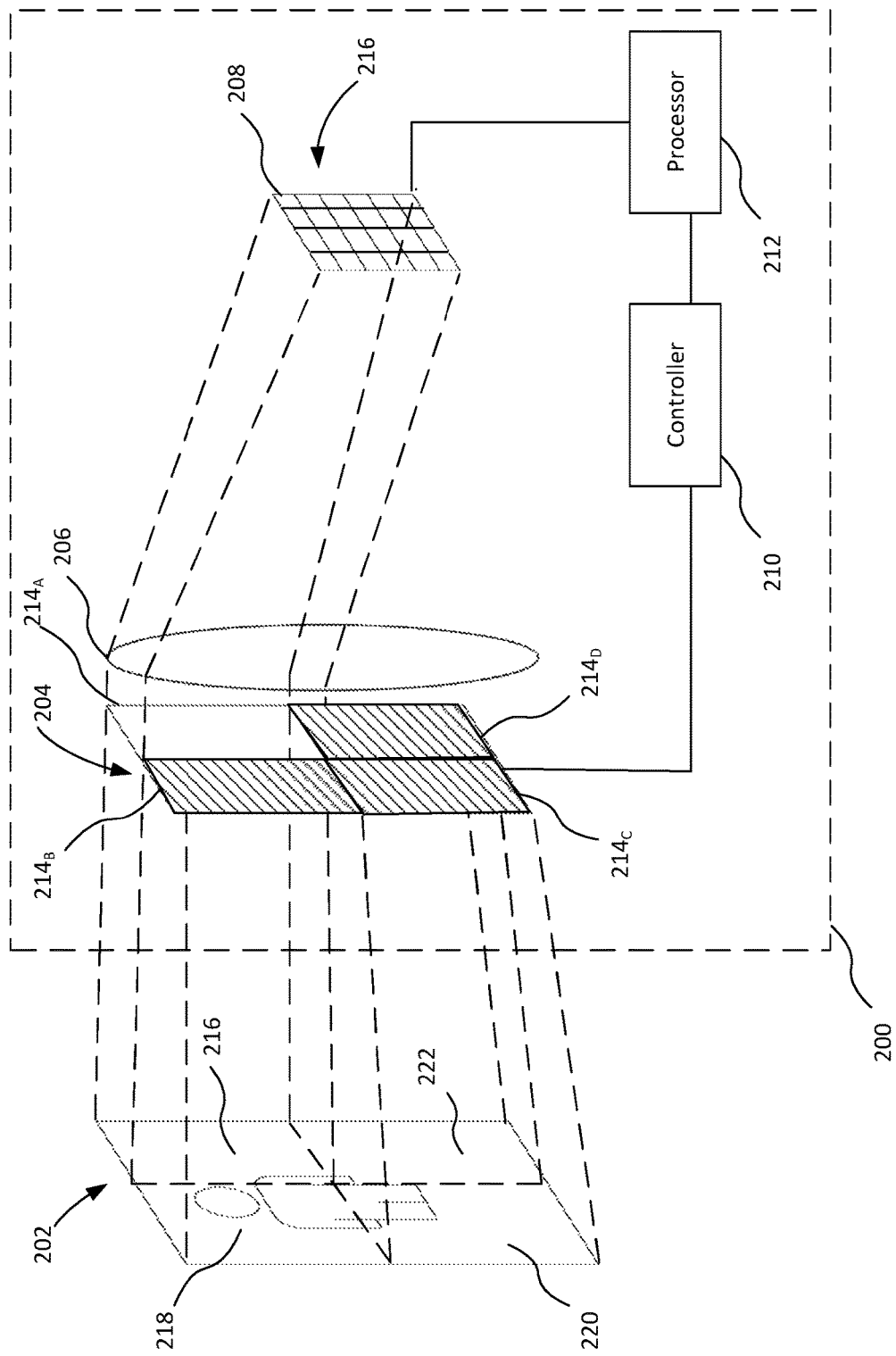
FIG. 2 shows a schematic illustration of an imaging device that sequentially captures portions of a scene.

FIG. 2 shows a schematic illustration of an imaging device 200 capturing an image of a scene 202. The imaging device 200 comprises an optical arrangement comprising a liquid-crystal array 204 and a lens 206. The device 200 further comprises a sensor 208 comprising a plurality of pixels in an array denoted 216; a controller 210 and a processor 212.

The liquid-crystal array comprises a plurality of pixels. Each pixel of the LCA comprises one or more liquid crystals. The liquid-crystal array provides a plurality of windows each operable to selectively pass light from a portion of the scene 202. Each window may contain, or be formed from, one or more pixels. The array may comprise any suitable number of pixels. The array may for example have full high-definition resolution (1920 by 1080 pixels). In other examples the array may be of higher resolution (e.g. 3840 by 2160 pixels) or lower resolution (e.g. 720 by 576 pixels or 720 by 480 pixels). In this example the array provides four windows, denoted $214_{A-D}$. That is, each window of the array can operate in a first state in which it does not substantially impede light from passing through it, and a second state in which it does substantially impede light from passing through it. In other words, when a window is in the first state it is optically transmissive, and when in the second state it is optically opaque. In this example, windows $214_{B-D}$ are in a state in which they block light from passing through. This state is indicated by the dashed markings. Window $214_A$ is in a state in which it passes light without substantial impediment.

The crystals within a pixel of the LCA can be aligned in a particular orientation under the control of the controller 210 in order to block or permit light from passing through. Each pixel of the LCA may comprise a pair of electrodes capable of applying a potential difference across the crystals in that pixel in order to control their alignment and orientation. Each pixel of the LCA may be independently controllable by the controller 210. Thus the delineation of the windows in the LCA may be not be fixed or predetermined, but may be set by the controller. For example, the controller may define a window within the LCA by addressing the electrodes of a block of pixels in order to align the crystals within that block along the same orientation. Alternatively, the windows of the LCA may be fixed in the sense that the controller 210 can only control predetermined blocks of pixels within the LCA, rather than being able to control each pixel independently.

To ensure that the LCA is operable to substantially mask out regions of a scene, the imaging device may additionally comprise an initial polarising filter (not shown) to polarise incoming light before it passes through to the LCA. If the light coming in to the LCA is polarized, the controller 210 can cause each window of the LCA to be optically transmissive or optically opaque by rotating the polarisation angle of the windows (i.e. the polarization angle of light that is filtered by each window).

Although shown as a separate component, the controller 210 and array 204 may form part of a single component. For example, the controller may be integrated with the array. In one example, the controller and liquid-crystal array form part of a liquid crystal on silicon (LCoS) device. The LCoS device may comprise a liquid crystal layer on top of a silicon backplane. In another example the liquid-crystal array 204 is an LCD panel.

The lens 206 is disposed between the liquid-crystal array 204 and the image sensor 208. It is configured to focus light passing through each window of the liquid-crystal array 204 onto to the sensor 208. In this example, the lens 206 is configured to focus light passing through each window on to all of the pixels of the image sensor. That is, light passing through window $214_A$ is focussed on to each pixel of the sensor array 216; light that passes through window $214_B$ is focussed on to each pixel of the sensor array 216; light that passes through window $214_C$ is focussed on to each pixel of the sensor array and light that passes through window $214_D$ is focussed on to each pixel of the sensor array.

Although shown in FIG. 2 as a bi-concave lens, it will be appreciated that this is schematic illustration for the purposes of example only. As will become apparent from the various examples described herein, the shape and/or configuration of the lens may vary depending on the particular configuration of the imaging device. The optical properties of the lens may for example depend on the physical arrangement of the imaging device, such as the distance between the lens and the sensor; the size of the sensor relative to the size of windows in the liquid-crystal array; the arrangement of the windows in the liquid-crystal array etc. The lens may be symmetrical about one or more axes. These axes of symmetry may correspond to axes of symmetry defined by the arrangement of windows within the liquid-crystal array. The lens may comprise multiple sub-lenses each configured to focus light passing through a corresponding window of the array onto the sensor. That is, the lens may comprise a number of sub-lenses equal to the number of windows provided by the array 204. Each of the sub-lenses may be integrated together.

The sensor 208 comprises a plurality of pixels, in this example arranged in a regular array. The sensor may therefore be referred to as a pixel sensor. The sensor may be a solid state device, such as a CMOS sensor or a CCD sensor. Each pixel of the sensor is used to generate a charge in dependence on the intensity of light incident on that pixel. The charge for each pixel is processed in order to generate a digital value for that pixel that is indicative of the amount of light received by that pixel. The sensor may comprise a processing block (not shown) to process the values read for each pixel in the sensor to form the digital representation of the captured image. The sensor 208 may comprise any suitable number of pixels. It could for example contains upwards of 1 megapixel (MP), e.g. 10 MP, 20 MP etc. Of course, for lower resolution sensors it sensor 208 may contain fewer numbers of pixels.

Figure 4:
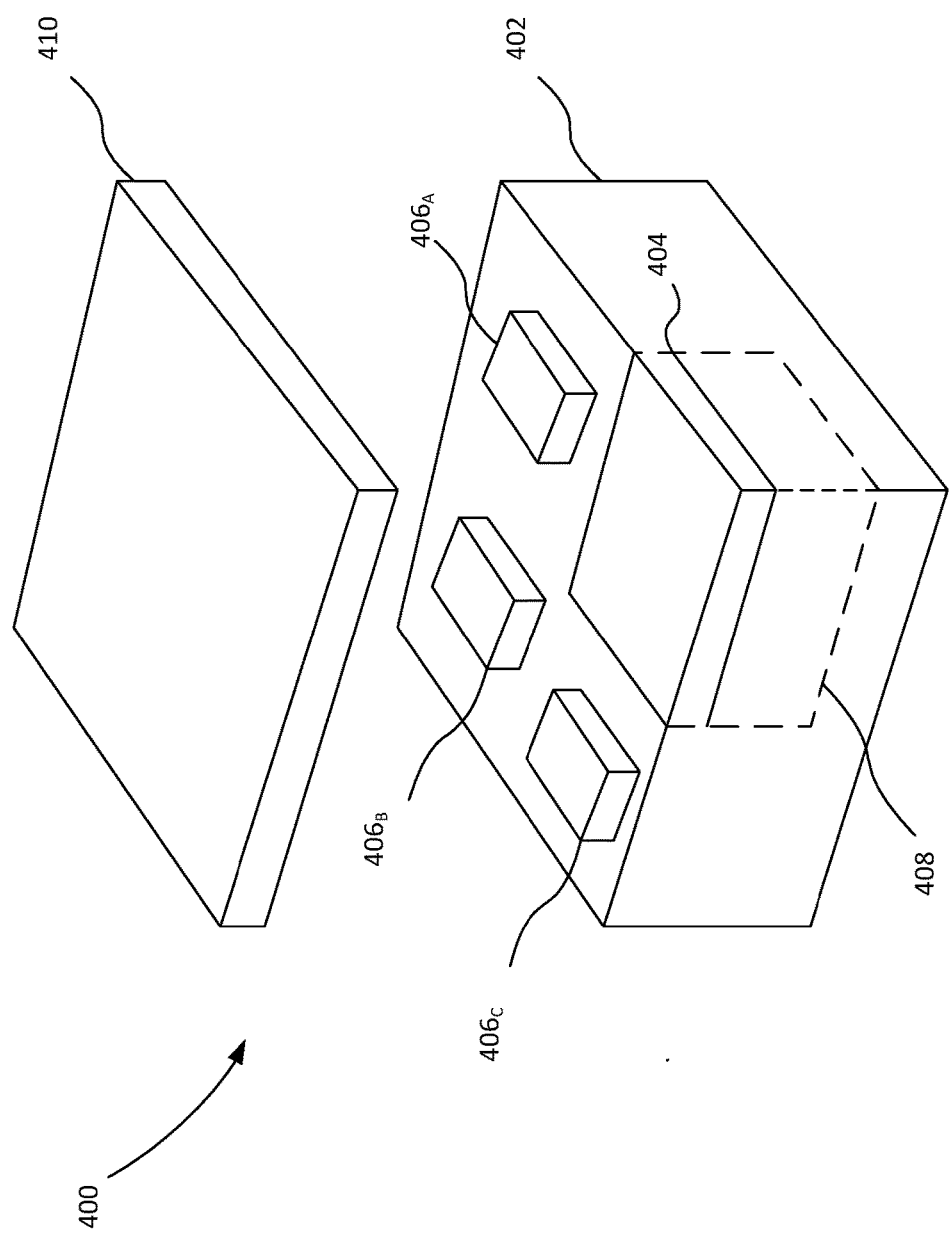
FIG. 4 shows an exploded view of a pixel forming part of the sensor.

FIG. 4 shows an example of a sensor pixel 400 in an exploded view. In this example the pixel is that for a CMOS sensor. The pixel comprises a substrate 402 (e.g. a silicon substrate). Each pixel in the array 208 may be mounted on a single substrate. The pixel further comprises a photodetector 404, support transistors $406_{A,B,C}$, a potential well 408 and a filter 410. The photodetector may be a photodiode. As described above, the photodetector is configured to release electrons in response to absorbing incident light of a predetermined threshold intensity. The number of electrons that are released may be proportional to the intensity of the incident light. The released electrons are collected in the potential well 408, shown here in cross-section as indicated by the dashed markings. The electrons collected for each pixel are used to generate a signal that may be processed to generate a digital representation of the captured image. The support transistors $406_{A,B,C}$ may be used to convert the charge collected in the potential well into a voltage within the pixel and to transfer that voltage to the processing block of the sensor. The support transistors may additionally be operable to reset the photodiode to enable the pixel to capture a new image.

The filter 410 may be a colour filter which has an associated passband to only permit light from a certain sub-band of the colour spectrum to pass through and to block light from the remaining parts of the colour spectrum. The colour filter may lie above the photodetector (as shown) to permit the photodetector to only absorb a certain colour, or sub-band, of light. The filter may for example be a red, a blue or a green filter, where a red filter is one that only permits red light to pass through (i.e. the passband lies in the red part of the colour spectrum), a green filter is one that permits only green light to pass through (i.e. the passband lies in the green part of the colour spectrum) and a blue filter is one that permits only blue light to pass through (i.e. the passband lies in the blue part of the colour spectrum). Each pixel may therefore only be able to detect light of a single colour. The colours of the filters may be distributed across the pixels of the sensor as a mosaic, or pattern (for example as a Bayer array).

The pixel 400 may additionally comprise a micro lens (not shown) to focus incident light onto the photodetector 404.

It will be appreciated that the pixel 400 is merely an example and that other types of sensors may comprise pixels with different structures and/or comprising different components. For example, the pixels of a CCD sensor may comprise a substrate, potential well, photodetector and filter, but may not comprise support transistors.

The processor 212 is configured to generate an image of the scene 202 from multiple captured sub-regions of the scene. This will be described in more detail below. Although shown as a separate block, the processor may be integrated with the sensor on a single chip. Alternatively or in addition, the controller 210 and processor 212 may form part of a single processing block.

The operation of the imaging device 200 to capture an image of scene 202 will now be described with reference to FIGS. 2 and 3.

The imaging device 200 uses the liquid-crystal array 204 to sequentially mask, or block out, portions of the scene to be captured 202 so that the sensor 208 captures only portions of the scene at a time. To do this the controller 210 causes the array 204 to permit light to pass through a sequence of windows whilst at each stage preventing light from passing through the remaining windows of the array. In this manner the sensor 208 is used to sequentially capture portions of the scene 202. The imaging device can do this because regardless of which window of the array passes light, the lens arrangement 206 focuses that light onto the sensor 208. The processor 212 then constructs the whole image of scene 202 from the captured portions of the scene.

For example, in order to capture scene 202, the controller may initially cause the array 204 to permit light to pass through window $214_A$ whilst preventing light from passing through remaining windows $214_{B-D}$. This is shown in FIG. 2. Thus light from the portion 216 of the scene 202 passes through window $214_A$ and is focused by the lens 206 onto the sensor 208. At this stage of the sequence light from the remaining portions 218-222 of the scene is masked out; i.e. it is blocked from passing through the lens by the liquid-crystal array. The sensor 208 then captures the portion 216 of the scene 202. The captured portion of the scene may then be written to memory (not shown). The controller may then control the array 204 so that light passes through window $214_B$ and is blocked from passing through the remaining windows $214_{A,C,D}$. This is shown in FIG. 3 at 300 (please note that the controller and processor have been omitted from FIG. 3 for the purposes of clarity). Thus at this stage of the sequence, light emanating from portion 218 of the scene 202 passes through window $214_B$ and is focused by the lens onto the sensor 208, and light emanating from the remaining portions 216,220,222 of the scene is blocked by the array 204. The sensor can then capture portion 218 of the scene 202. This captured portion of the scene may then be written to memory. Next, the controller can control the array so that light passes through window $214_C$ but is blocked from passing through widows $214_{A,B,D}$. This is shown in FIG. 3 at 302. Thus at this stage of the sequence light emanating from portion 220 of the scene 202 passes through window $214_C$ and is focused onto the sensor 208 by the lens 206 but light emanating from the remaining portions 216, 218, 222 of the scene is blocked by the array 204. The sensor can then capture portion 220 of the scene 202. During the final stage of the sequence the controller controls the array so that light is permitted to pass through window $214_D$ but is prevented from passing through the remaining windows $214_{A-C}$. This is shown in FIG. 3 at 304. Thus light emanating from the portion 222 of the scene 202 passes through window $214_D$ and is focused by the lens 206 onto the sensor 208, but light emanating from portions 216-220 is blocked by the array 204. The sensor can then capture the remaining portion of the image 222.

During each stage of the sequence the captured portion of the scene may be written to memory. This could be an internal memory to the imaging device 200 or to an external memory.

Figure 3:
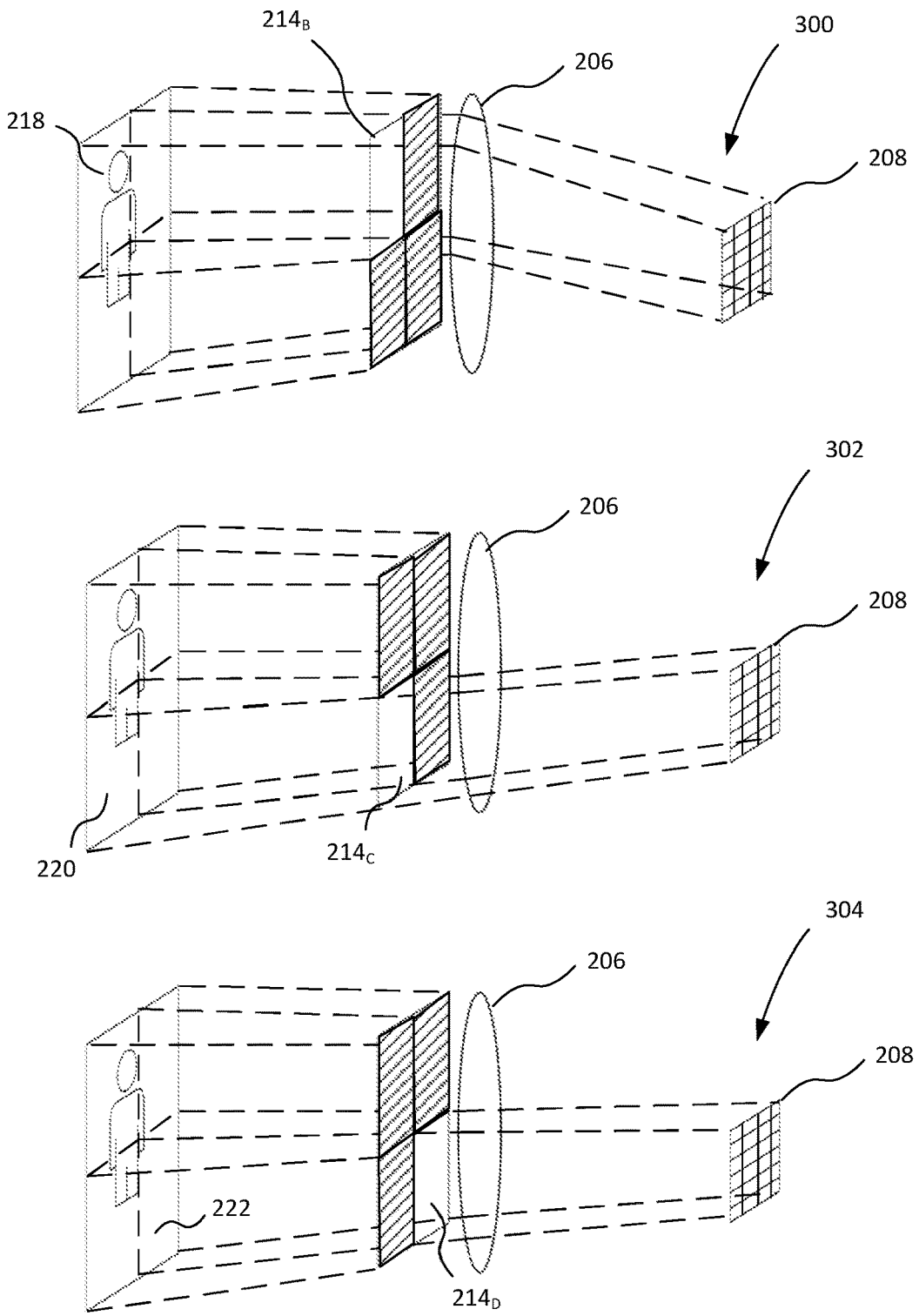
FIG. 3 illustrates the control of a liquid-crystal array to sequentially mask out regions of a scene to be imaged so that the sensor in turn sequentially captures portions of the scene.

It will be appreciated that the sequence of array windows that are permitted to pass light illustrated in FIGS. 2 and 3 is merely an example and that other sequences may be implemented to capture portions of the scene. For example, the windows may be controlled sequentially in column-wise fashion, row-wise fashion, or according to some other sequence.

The processor then constructs the whole image of the scene 202 using the captured portions of the scene. The processor may do this by performing a stitching algorithm. The stitching algorithm may be a type of image registration algorithm, such as the patch-based translational alignment technique, the correlation-based method, the sequential method, the Fourier-based method or the elastic-model-based registration technique. The processor may need to process the image to remove artifacts at the boundaries between two adjacent portions of the scene, such as blurring, discontinuities, overlap etc. Once the image of the scene has been constructed, the image may be written to a memory.

In order to assist with constructing the image of the scene, each window of the liquid-crystal array 204 may partially overlap with its adjacent windows. For example, pixel(s) forming part of one window may also form part of an adjacent window. This may introduce a certain degree of overlap between adjacent portions of the scene captured by the sensor. That is, the boundary of one captured portion of the scene may at least partially overlap with the boundary of an adjacent captured portion of the scene. This may assist the processor in stitching together the full image by enabling the processor to bleed the boundaries of adjacent portions of the scene.

Sequentially capturing sub-regions of a scene means the scene may be imaged at a higher pixel resolution compared to a conventional imaging device using an equivalently sized sensor. This is because an equivalent number of pixels used in a conventional imaging device to capture a scene may be used in the present imaging device to capture only a portion of the scene. For similar reasons, an image at an equivalent pixel resolution may be obtained with a smaller sensor compared to a conventional imaging device. This is advantageous because reducing the size of the sensor may reduce the cost of the imaging device, or reduce its power consumption. The reduced sensor size may also reduce the occupied chip area to potentially allow single-chip solutions for image sensors and graphic processing.

Figure 5:
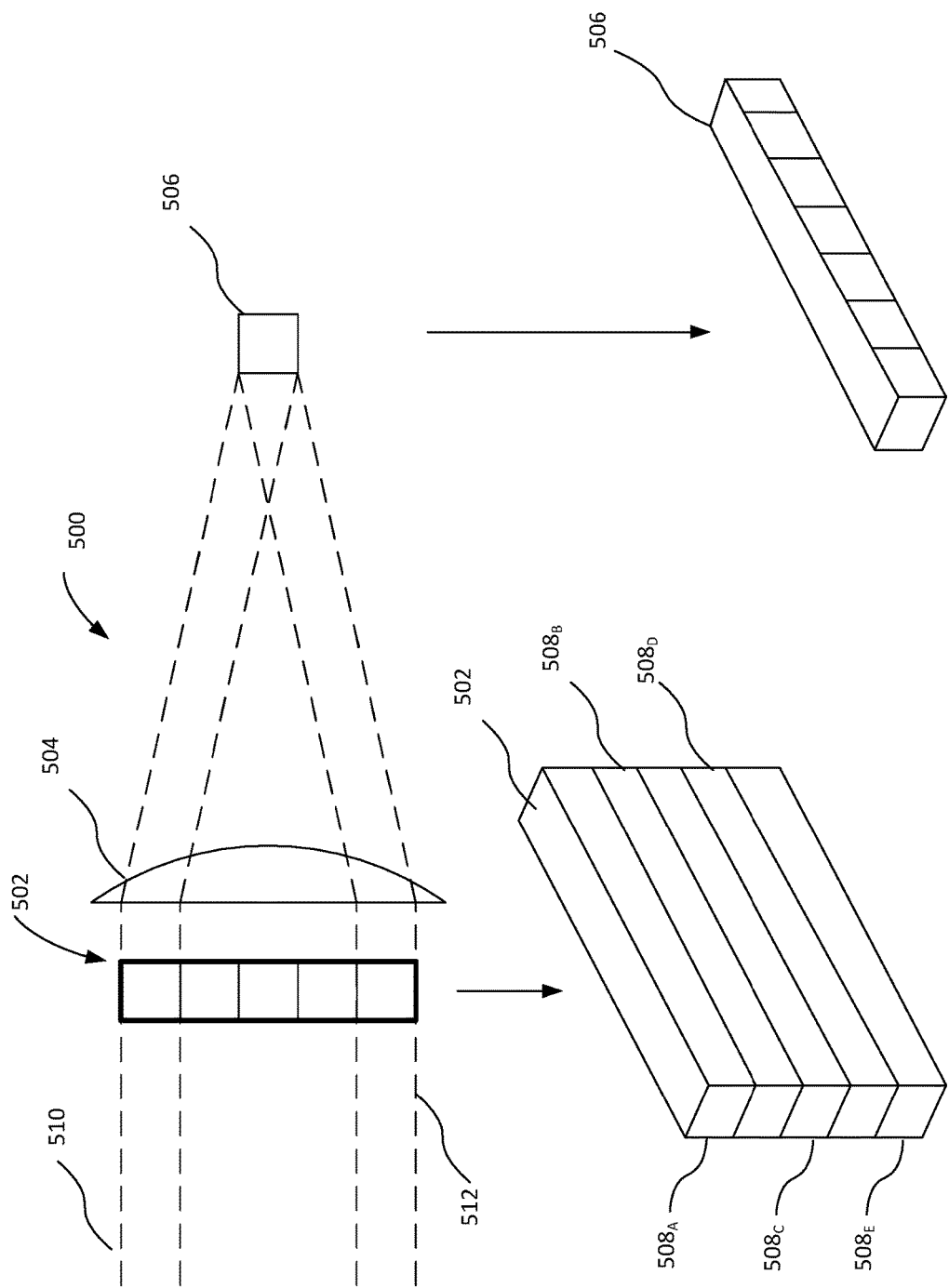
FIG. 5 shows an alternative example of an imaging device for sequentially capturing portions of a scene.

It will be appreciated that there are various configurations of lenses and sensors that may be used within the imaging device. FIG. 5 shows an example arrangement of a liquid-crystal array 502, lens 504 and sensor 506 within an imaging device 500. In this figure other components of the imaging device, such as the processor and controller, have been omitted for clarity. The array 502 and the sensor 506 are shown in both a side view and isometric view.

The array 502 comprises a plurality of windows $508_{A-E}$ each configured to selectively pass light under the control of the controller (not shown). As can be seen more clearly in the isometric view, the windows of the array are arranged as a series of rows, where each row consists of a single window. Thus during operation, the controller can control the array to pass light through a sequence of rows whilst at each stage of the sequence preventing light from passing through the remaining rows of the array. Although in this example the array comprises five rows, it will be appreciated that this is merely for the purposes of illustration, and that any suitable number of rows may be used. The array may for example contain 480 rows (e.g. if the array is a 'standard definition' array), 1080 rows (e.g. if the array is a 'high definition' array) or a greater or fewer numbers of rows.

Similarly to before, the lens 504 is configured to focus light passing through each window of the liquid-crystal array onto the sensor 506. For example, light passing through window 508$_A$ is focused onto the sensor 506 as indicated by the dashed markings 510, and light passing through window 508$_E$ is focused onto the sensor 506 as indicated by the dashed markings 512.

The sensor 506 is operable to sequentially capture portions of a scene. As can be more clearly seen in the isometric view, the pixels of the sensor are arranged in a one-dimensional array, i.e. in a single row. Expressed generally, the pixels are arranged in an m by 1 linear array, where m could be any suitable value, for example, 720, 1920 or 3840, or other suitable values.

Vertical resolution of a captured image is provided by using a sequence of rows of the liquid-crystal array to capture a sequence of portions of the scene. Thus the imaging device 500 can be used to capture a higher resolution image of a scene compared to a conventional device using an equivalently sized sensor. As well as possessing the advantages of the imaging system discussed previously, the arrangement shown in FIG. 5 may have the additional advantage of being relatively simple to implement due to its reduced optical complexity. By arranging the windows of the liquid-crystal array as a series of rows, the liquid-crystal array is effectively reduced from a two-dimensional array (e.g. as shown in FIG. 2) to a one-dimensional array. In addition, configuring the sensor as a linear array (as opposed to a two-dimensional array as shown in FIG. 2) reduces the optical requirements placed on the lens.

Although the pixels of the sensor are shown in FIG. 5 as a linear horizontal array, in an alternative example they may be arranged as a linear vertical array. That is, the sensor may instead be arranged as a single m by 1 column of pixels (where again, m could be for example 720, 1920 or 3840 or other suitable values). In this case the liquid-crystal array may comprise a plurality of windows arranged as a series of columns, where each column consists of a single window. Under the control of the controller, the array can permit light to pass through a sequence of columns whilst at each stage of the sequence preventing light from passing through the remaining columns of the array. In such an arrangement, vertical resolution of the captured image is provided by the pixels of the sensor and horizontal resolution is provided by using a sequence of columns of the liquid-crystal array to capture a sequence of portions of the scene.

Figure 6:
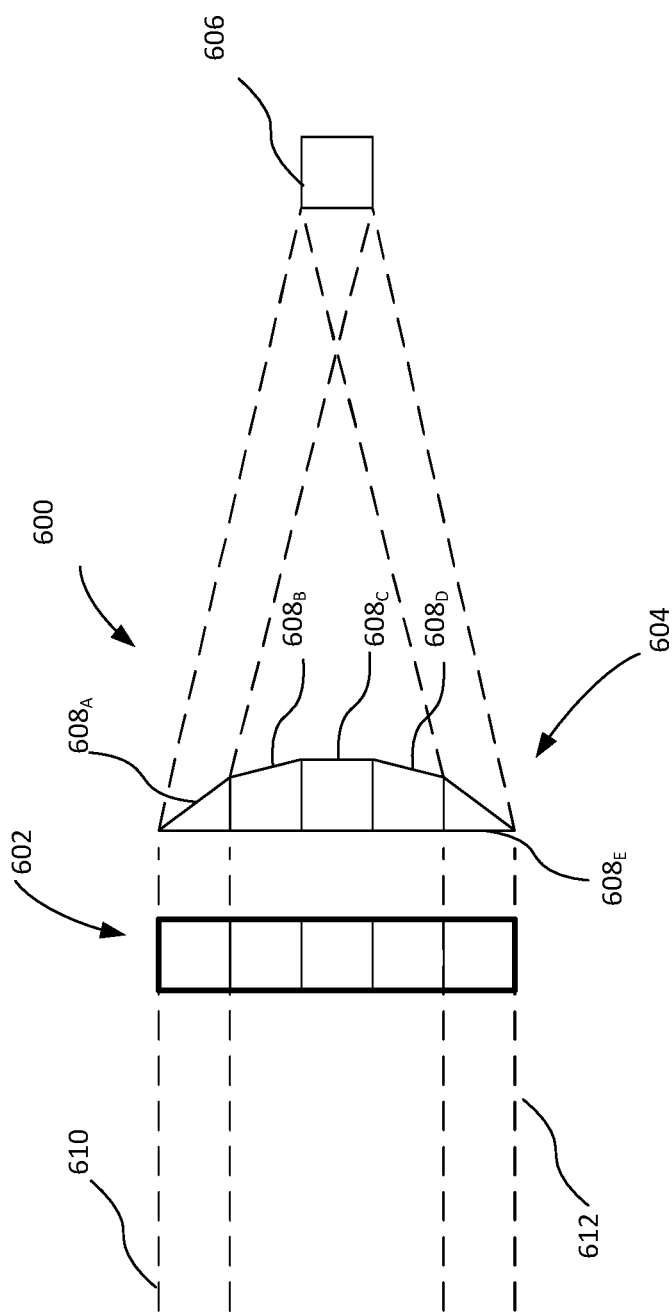
FIG. 6 shows another example of an imaging device for sequentially capturing portions of a scene that has an optical arrangement comprising a plurality of optical elements.

FIG. 6 shows an imaging device 600 with an alternative optical arrangement comprising multiple optical elements, denoted generally at 604, and a liquid-crystal array 602. The device 600 further comprises a sensor 606. Again the other components of the imaging device, for example the controller, the processor, aperture etc., have been omitted for the purposes of clarity. The imaging device is shown in side view.

Similarly to the previous examples, array 602 comprises a plurality of windows each operable to selectively pass light under the control of the controller.

In this example the optical arrangement of the imaging device comprises a plurality of optical elements 608$_{A-E}$, as opposed to a single lens as shown in previous examples. In this example the number of optical elements is equal to the number of windows in the array 602. That is, each optical element is configured to focus light passing through a corresponding window of the array onto the sensor 606. In this example each optical element is a prism, but in other examples each optical element may be a lens. The geometric properties of each prism may be determined by the specific implementation of the imaging device so as to direct incoming light onto the sensor (for example the distance between the optical element and the sensor, the relative angular positions of the optical element and sensor etc.). As an illustration, FIG. 6 shows incoming light 610 and 612 (indicated by the dashed markings) being directed onto sensor 606 by optical elements 608$_A$ and 608$_E$ respectively.

Although the sensor 606 shown in FIG. 6 comprises a linear array of pixels, it will be appreciated that an optical arrangement comprising a plurality of optical elements may be used with a two-dimensional pixel sensor array and/or a liquid-crystal array having a two-dimensional array of windows (e.g. as shown in FIG. 2).

In the examples described above the imaging devices comprise an optical arrangement having a mask unit in the form of a liquid-crystal array. It will be appreciated that other forms of the mask unit can be envisaged that are operable to pass light from a portion of a scene whilst blocking light from other portions of the scene. For example, the mask unit may be in the form of a plate encompassing an aperture. The aperture passes light emanating from a portion of the scene whilst the plate blocks light emanating from other portions of the scene. The controller may actuate the plate (e.g. by causing it to rotate) so that the aperture passes light from a sequence of portions of the scene. In this example the optical elements may be disposed between the mask unit and the image sensor.

The optical elements and the mask unit may alternatively be integrated together. For example, the mask unit may be in the form of a plate that is integral with and encompasses a lens. The lens focuses light emanating from a portion of the scene onto the sensor whilst the plate blocks light emanating from the remaining portions of the scene. The controller may actuate the plate (e.g. by causing it to rotate) so that the lens focuses light from a sequence of portions of the scene onto the image sensor.

In yet another example, the imaging device may comprise an actuatable lens. The lens may for example comprise a piezoelectric film. The controller may be configured to apply a voltage across the film in order to alter the configuration of the lens (e.g. its size and/or shape). The lens may be configured to focus a portion of the scene onto the sensor and focus the remaining portions of the scene in regions of a focal plane surrounding the sensor. That is, the focal plane of the lens may encompass (and be coplanar with) the image sensor, but not all of the scene is focused onto the sensor. The controller could control the voltage across the piezoelectric film to alter the configuration of the lens so that the lens sequentially focuses light from portions of the scene on to the sensor (i.e. the lens is actuated through a sequence of configurations so that light from a sequence of portions of the scene is focused onto the sensor). In this example there may be no need for a masking unit.

Various examples have been described herein in which the imaging device comprises a single lens disposed between the mask unit and image sensor. It will be understood that in other examples the imaging device may comprise an arrangement of lenses so that light emanating from each portion of the scene is focused onto the image sensor via multiple lenses. The specific lenses used within the imaging device may be implementation specific. The lenses could be bi-convex, planar convex, bi-concave, planar concave or a combination thereof. Although in the examples illustrated herein the optical elements are shown spaced apart from the liquid-crystal array, in other examples the or each of the optical elements may be flush with the array or otherwise integrated. For example, if a lens or prism comprises a planar surface, that planar surface may be integral or flush with the surface of the liquid-crystal array. This may reduce the deviance of light between the array and optical element enabling the optical element to more accurately focus light onto the sensor.

The imaging devices described herein may form part of an image capturing device such as a digital camera. It may alternatively form part of a more general purpose electronic device capable of taking digital photos (e.g. a laptop, smartphone, tablet etc.).

The imaging device of FIG. 2 is shown as comprising a number of functional blocks. This is schematic only and is not intended to define a strict division between different logic elements of such entities. Each functional block may be provided in any suitable manner. It is to be understood that intermediate values described herein as being formed by an imaging device need not be physically generated by the imaging device at any point and may merely represent logical values which conveniently describe the processing performed by the imaging device between its input and output.

Generally, any of the functions, methods or techniques performed by the controller and processor described above can be implemented in software, firmware, hardware (e.g., fixed logic circuitry), or any combination thereof. The terms "processor" and "controller" may be used herein to generally represent software, firmware, hardware, or any combination thereof. In the case of a software implementation, the processor or controller represents program code that performs the specified tasks when executed on a hardware processor. The algorithms and methods described herein could be performed by one or more hardware processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. An imaging device for capturing an image of a scene, comprising:
    an image sensor comprising a plurality of pixels;
    an optical arrangement operable to focus light from a portion of the scene onto the image sensor whilst preventing light from other portions of the scene from being focused onto the sensor;
    a controller configured to cause the optical arrangement to focus light from a sequence of portions of the scene onto the sensor so that the sensor captures the said sequence of portions of the scene; and
    a processor configured to use the captured portions of the scene to construct an image of the scene so that the constructed image contains pixel data for a number of pixels greater than the number of pixels in the image sensor.

2. An imaging device as claimed in claim 1, wherein the optical arrangement comprises a mask unit and one or more optical elements.

3. An imaging device as claimed in claim 2, wherein the mask unit is operable to pass light from a portion of the scene whilst blocking light from other portions of the scene, and the one or more optical elements are configured to focus light passing through the mask unit on to the image sensor.

4. An imaging device as claimed in claim 3, wherein the controller is configured to cause the mask unit to pass light from a sequence of portions of the scene so that the sensor captures the said sequence of portions of the scene.

5. An imaging device as claimed in claim 2, claim wherein the one or more optical elements are disposed between the mask unit and the image sensor.

6. An imaging device as claimed in claim 2, wherein the mask unit is integral with the one or more optical elements.

7. An imaging device as claimed in claim 2, wherein the mask unit is a liquid-crystal array providing a plurality of windows each operable to pass light from a portion of the scene whilst blocking light from other portions of the scene.

8. An imaging device as claimed in claim 7, wherein the controller is configured to cause the array to pass light through a sequence of windows whilst at each stage preventing light from passing through remaining windows of the array.

9. An imaging device as claimed in claim 8, wherein the image sensor comprises a plurality of pixels and the one or more optical elements are configured to focus light passing through each window of the liquid-crystal array on to the pixels of the image sensor.

10. An imaging device as claimed in claim 9, wherein the windows of the liquid-crystal array are arranged in a series of rows, and the one or more optical elements are configured to focus light passing through the window of each row on to the pixels of the image sensor.

11. An imaging device as claimed in claim 9, wherein the windows of the liquid-crystal array are arranged in a series of columns, and the one or more optical elements are configured to focus light passing through the window of each column on to the pixels of the image sensor.

12. An imaging device as claimed in claim 7, wherein the liquid-crystal array is an LCD device.

13. An imaging device as claimed in claim 7, wherein the liquid-crystal array is an LCoS device.

14. An imaging device as claimed in claim 1, wherein the processor is configured to stitch the captured portions of the scene together to construct the image of the scene.

15. An imaging device as claimed in claim 2, wherein the one or more optical elements are a single lens.

16. An imaging device as claimed in claim 7, wherein the optical arrangement comprises a plurality of optical elements each corresponding to one or more windows of the liquid-crystal array, each optical element being configured to focus light passing through its corresponding one or more windows on to the sensor.

17. An imaging device as claimed in claim 16, wherein each of the optical elements is a prism or each of the optical elements is a lens.

18. A method of capturing an image of a scene with an imaging device having an image sensor comprising a plurality of pixels and an optical arrangement operable to focus light from a portion of the scene onto the image sensor whilst preventing light from other portions of the scene from being focused onto the sensor, the method comprising:
    electronically controlling the optical arrangement to focus light from a sequence of portions of the scene onto the sensor so the sensor captures the said sequence of portions of the scene; and
    using the captured portions of the scene to construct an image of the scene that contains pixel data for a number of pixels greater than the number of pixels in the image sensor.

19. A non-transitory computer readable storage medium having stored thereon instructions which, when executed at an imaging device having an image sensor comprising a plurality of pixels and an optical arrangement operable to focus light from a portion of a scene onto the image sensor whilst preventing light from other portions of the scene from being focused onto the sensor, causes the imaging device to perform a method of capturing an image of the scene comprising:
    electronically controlling the optical arrangement to focus light from a sequence of portions of the scene onto the sensor so the sensor captures the said sequence of portions of the scene; and
    using the captured portions of the scene to construct an image of the scene that contains pixel data for a number of pixels greater than the number of pixels in the image sensor.

* * * * *